(12) United States Patent
Johns et al.

(10) Patent No.: US 7,690,585 B1
(45) Date of Patent: Apr. 6, 2010

(54) VOLCANO FOOD FOUNTAIN

(76) Inventors: Jason W. Johns, 136 W. Galena St., Cripple Creek, CO (US) 80813; Julie A. Johns, 136 W. Galena St., Cripple Creek, CO (US) 80813

( * ) Notice: Subject to any disclaimer, the term of this patent is extended or adjusted under 35 U.S.C. 154(b) by 884 days.

(21) Appl. No.: 11/489,866

(22) Filed: Jul. 20, 2006

(51) Int. Cl.
*E03B 9/20* (2006.01)
(52) U.S. Cl. .............................. 239/16; 239/20; 239/28; 99/452; 99/483
(58) Field of Classification Search .................. 99/483, 99/452; 239/16, 17, 20, 24, 28, 29.3; 222/405, 222/372
See application file for complete search history.

(56) References Cited

U.S. PATENT DOCUMENTS

| | | | | | |
|---|---|---|---|---|---|
| 746,125 | A | * | 12/1903 | Murphy | 137/560 |
| 1,218,969 | A | * | 3/1917 | Ziener | 239/20 |
| 1,243,126 | A | * | 10/1917 | Ziener | 239/20 |
| 1,549,204 | A | * | 8/1925 | Merigold | 239/20 |
| 6,450,122 | B1 | * | 9/2002 | Frank | 119/259 |
| 6,505,782 | B1 | * | 1/2003 | Yen | 239/17 |
| 6,848,628 | B2 | * | 2/2005 | Walker | 239/16 |
| 7,182,269 | B2 | * | 2/2007 | Muir et al. | 239/16 |
| 7,378,619 | B2 | * | 5/2008 | Rogers | 219/438 |

* cited by examiner

*Primary Examiner*—Reginald L Alexander

(57) ABSTRACT

A volcano food fountain is disclosed. An illustrative embodiment of the volcano food fountain includes a fountain base having a bowl, a simulated volcano carried by the fountain base in the bowl, a pump provided in the simulated volcano and communicating with the bowl, a volcano opening provided in the simulated volcano and communicating with the pump and a tray carried by the fountain base.

18 Claims, 7 Drawing Sheets

VOLCANO FOOD FOUNTAIN

FIELD

The present invention relates to food displays. More particularly, the present invention relates to a volcano food fountain in which liquid or liquid and solid food products are ejected from a simulated volcano.

BACKGROUND

Various types of food displays are known in the art for the purpose of presenting foods typically in a buffet or banquet setting. Food displays include various types of plates and trays on which food is presented as well as aesthetic devices that simulate the appearance of an animal or a natural structure such as a mountain or the like to emphasize a particular theme of a banquet or other occasion. Fountains are also known in which liquid chocolate continually flows down a sloped surface. Strawberries or the like which are placed around the sloped surface can be dipped into the chocolate and eaten.

SUMMARY

The present invention is generally directed to a volcano food fountain. An illustrative embodiment of the volcano food fountain includes a fountain base having a bowl, a simulated volcano carried by the fountain base in the bowl, a pump provided in the simulated volcano and communicating with the bowl, a volcano opening provided in the simulated volcano and communicating with the pump and a tray carried by the fountain base.

BRIEF DESCRIPTION OF THE DRAWINGS

The invention will now be described, by way of example, with reference to the accompanying drawings, in which.

DETAILED DESCRIPTION

Figure 3:
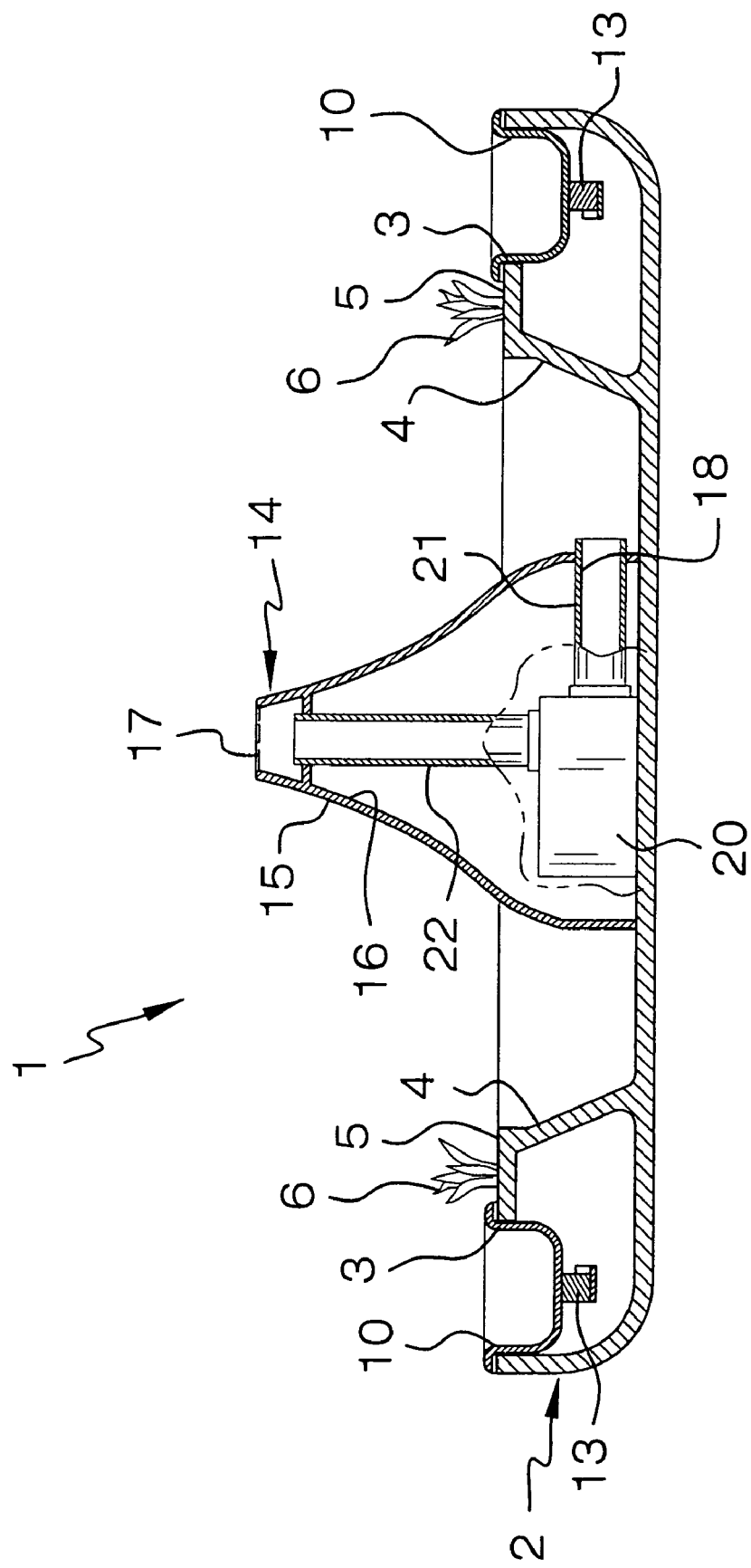
FIG. 3 is a cross-sectional view, taken along section lines 3-3 in FIG. 2, more particularly illustrating a pump provided in the simulated volcano element of the volcano food fountain.

Referring to the drawings, an illustrative embodiment of the volcano food fountain is generally indicated by reference numeral 1. The volcano food fountain 1 includes a fountain base 2 which may be plastic or metal, for example. As illustrated in FIG. 3, an annular tray slot 3 may be provided in the fountain base 2. A bowl 4 is provided in the central portion of the fountain base 2, typically inside the tray slot 3. A decorative surface 5, which may be annular, is typically provided between the tray slot 3 and the bowl 4. Various decorations, such as simulated vegetation 6, for example, may be provided on the decorative surface 5.

A simulated volcano 14 is provided at generally the center of the fountain base 2. The simulated volcano 14 includes a volcano wall 15 which extends upwardly from the fountain base 2, at generally the center of the bowl 4. A volcano interior 16 is defined by the volcano wall 15. A volcano opening 17 communicates with the volcano interior 16. An inlet opening 18 extends through the volcano wall 15 and communicates with the bowl 4.

As further shown in FIG. 3, a pump 20 is provided in the volcano interior 16 of the simulated volcano 14. The pump 20 may be any type of pump which is capable of pumping a liquid or liquid and solid medium. A pump inlet conduit 21 communicates with the inlet of the pump 20 and with the inlet opening 18 of the volcano wall 15. A pump outlet conduit 22 communicates with the outlet of the pump 20 and with the volcano opening 17 of the volcano wall 15. As will be hereinafter further described, the pump 20 is adapted to pump a liquid or liquid and solid food such as juice 44 (FIG. 1) and fruit pieces 45, for example, from the bowl 4 through the pump inlet conduit 21 and discharge the food from the volcano opening 17 of the simulated volcano 14 to simulate an erupting volcano. Accordingly, the food runs down the exterior surfaces of the volcano wall 15 and back into the bowl 4, where the pump 20 again pumps the food from the bowl 4 and discharges the food from the volcano opening 17, in continuous fashion.

Figure 2:
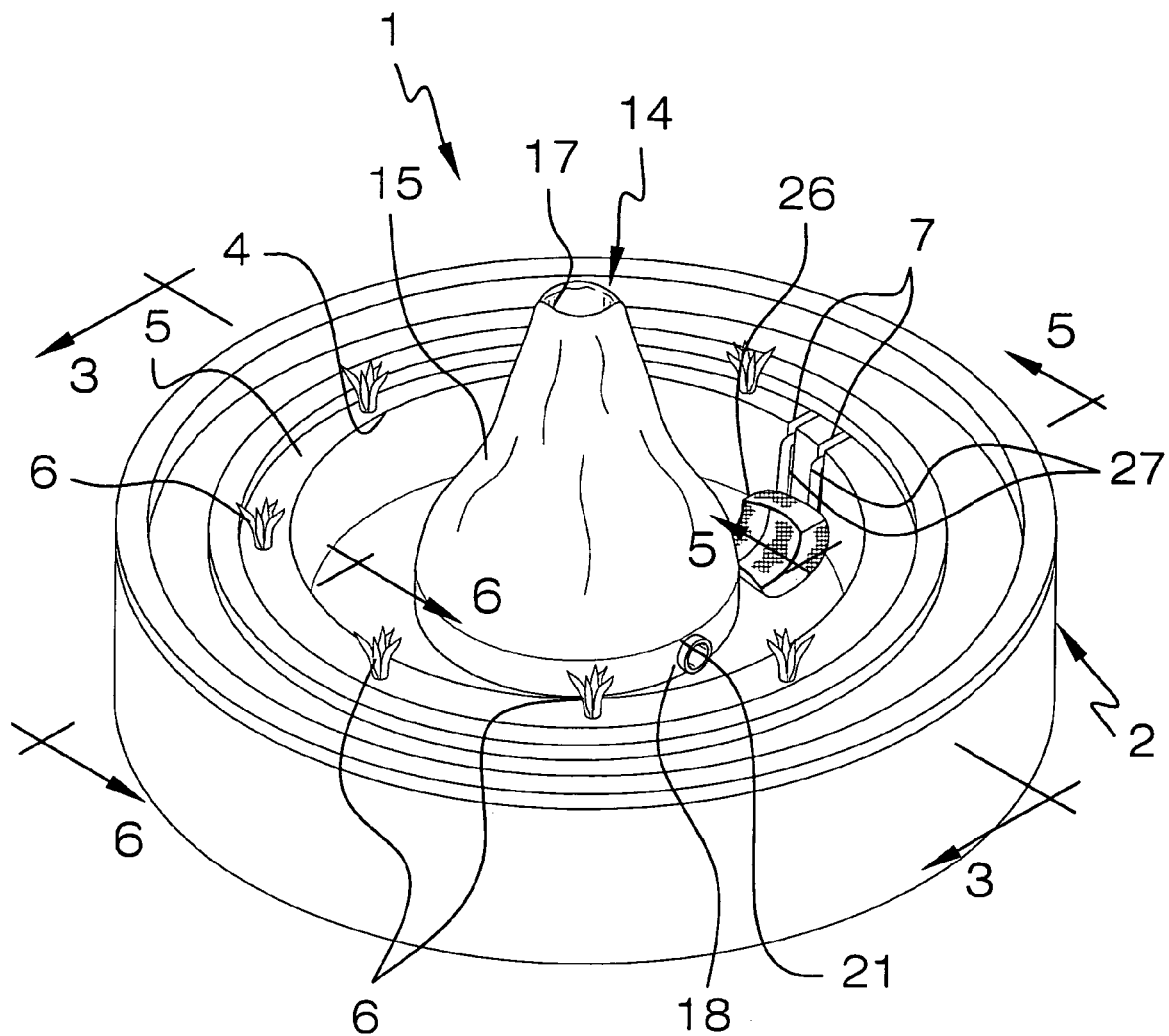
FIG. 2 is a perspective view of an illustrative embodiment of the volcano food fountain, more particularly illustrating a scoop provided in a bowl of the volcano food fountain.
Figure 4:
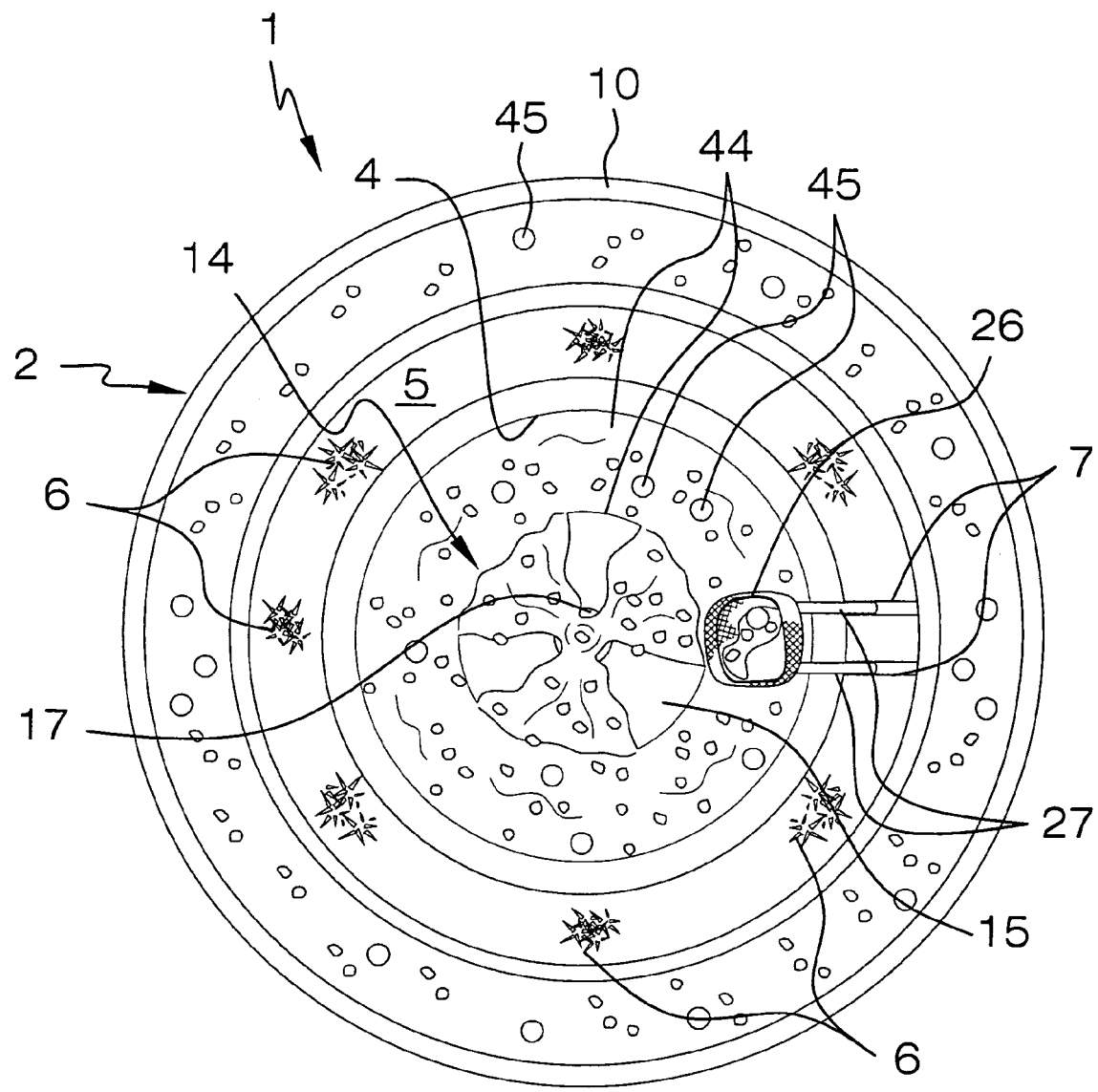
FIG. 4 is a top view of an illustrative embodiment of the volcano food fountain, more particularly illustrating liquid and solid food being pumped from the simulated volcano element and fruit supported on a tray element of the volcano food fountain.
Figure 5:
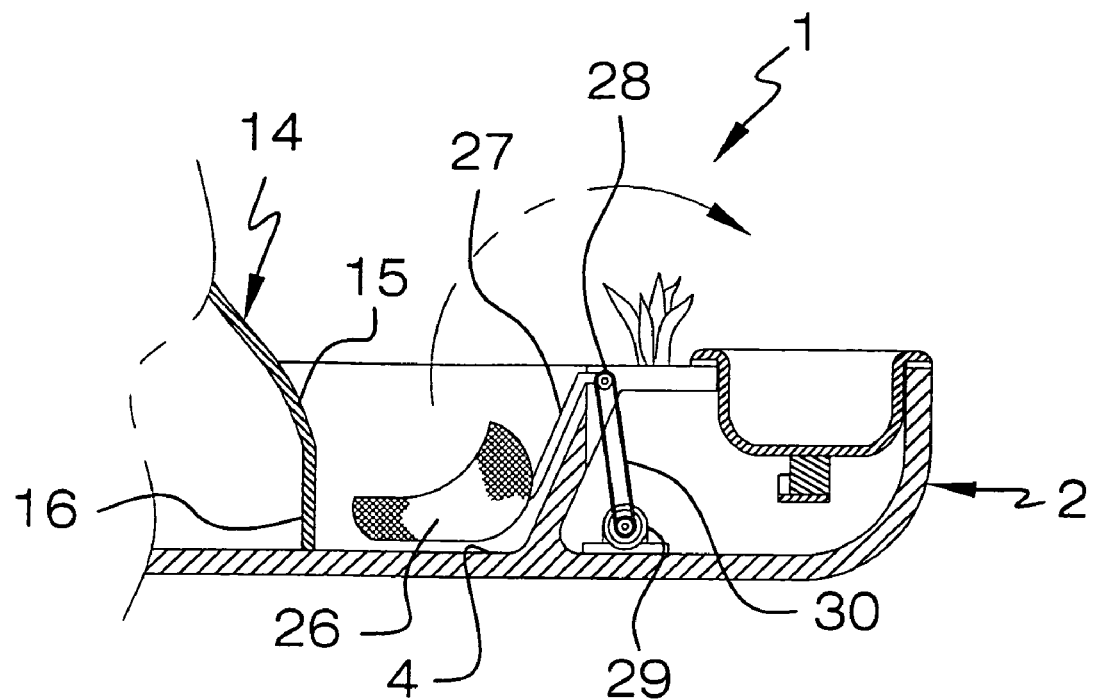
FIG. 5 is a sectional view, taken along section lines 5-5 in FIG. 2, more particularly illustrating an illustrative mechanism for raising and lowering the scoop in the bowl of the volcano food fountain.

As shown in FIGS. 2 and 4, a scoop 26 may be provided in the bowl 4 to facilitate lifting of the food from the bowl 4 during operation of the volcano food fountain 1. A pair of spaced-apart scoop slots 7 may extend through the wall of the bowl 4. A pair of scoop arms 27 extends from the scoop 26 and through the respective scoop slots 7. As shown in FIG. 5, the scoop arms 27 are pivotally attached to the fountain base 2 at an arm pivot 28. An arm raising and lowering mechanism is provided in the fountain base 2 and engages the scoop arms 27 at the arm pivot 28 to facilitate pivoting of the scoop arms 27 with respect to the arm pivot 28, and therefore, raising and lowering of the scoop 26 in the bowl 4. In some embodiments, the arm raising and lowering mechanism includes a servo motor 29 which is provided in the fountain base 2 and engages the arm pivot 28 through a drive belt 30. Accordingly, by operation of the servo motor 29 in a selected direction, the drive belt 30 causes selected raising and lowering of the scoop 26 in the bowl 4. A control switch (not shown) for the servo motor 29 may be provided on the fountain base 2.

Figure 6:
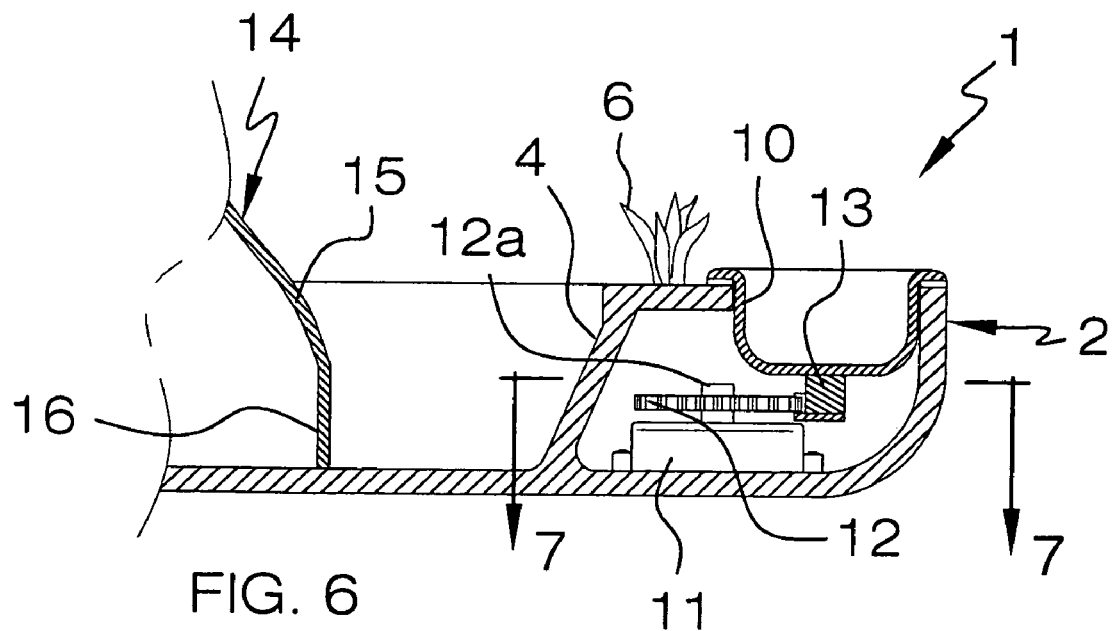
FIG. 6 is a sectional view, taken along section lines 6-6 in FIG. 2, more particularly illustrating an illustrative gear arrangement for rotating a tray on the volcano food fountain.

A tray 10, typically having an annular shape, is provided in the tray slot 3 of the fountain base 2. The tray 10 may have a generally U-shaped cross-sectional configuration, as shown in FIG. 3. The tray 10 is rotatable in the tray slot 3 with respect to the fountain base 2. As shown in FIG. 6, a tray drive motor 11 is provided in the fountain base 2 and operably engages the tray 10 to facilitate rotation of the tray 10 in the tray slot 3. For example, in some embodiments, a drive gear 12 is drivingly engaged by the tray drive motor 11 through a drive shaft 12a.

Figure 7:
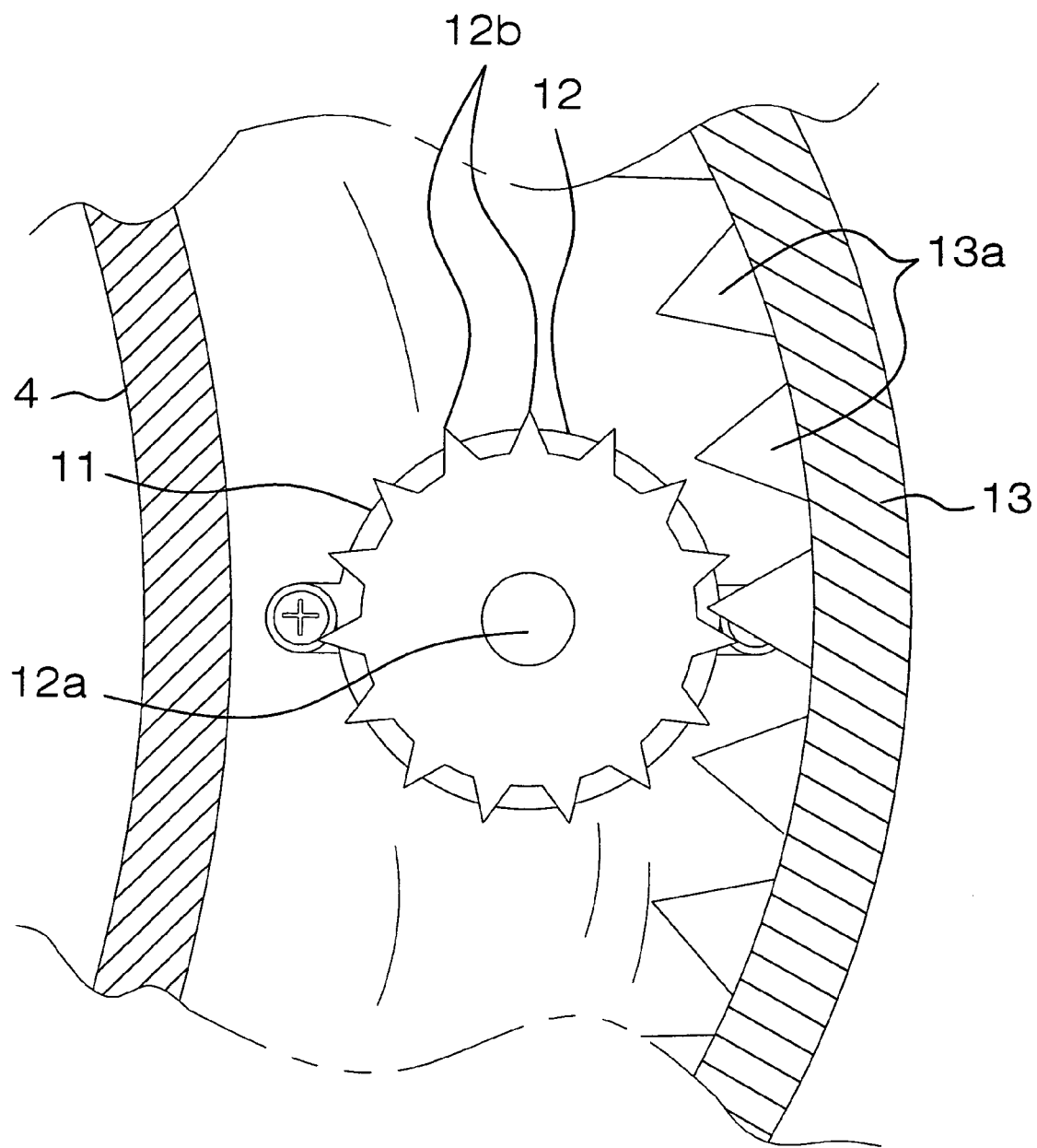
FIG. 7 is a top view, partially in section, of an illustrative drive gear operable to rotate the tray of the volcano food fountain.

A ring gear 13 is provided on the tray 10. As shown in FIGS. 6 and 7, drive gear teeth 12b provided on the drive gear 12 mesh with ring gear teeth 13a provided on the ring gear 13. Accordingly, by operation of the tray drive motor 11, the drive shaft 12a rotates the drive gear 12. In turn, the drive gear 12 rotates the ring gear 13, which rotates the tray 10 in the tray slot 3.

A power cord 32 (FIG. 8) is electrically connected to the pump 20 (FIG. 3), the servo motor 29 (FIG. 5) and the tray drive motor 11 (FIG. 6) of the volcano food fountain 1. A power switch 33 is provided typically in the power cord 32. A plug 34 terminates the power cord 32 for insertion in an electrical outlet 35. Additionally or alternatively, the various components of the volcano food fountain 1 may be battery-powered.

Figure 1:
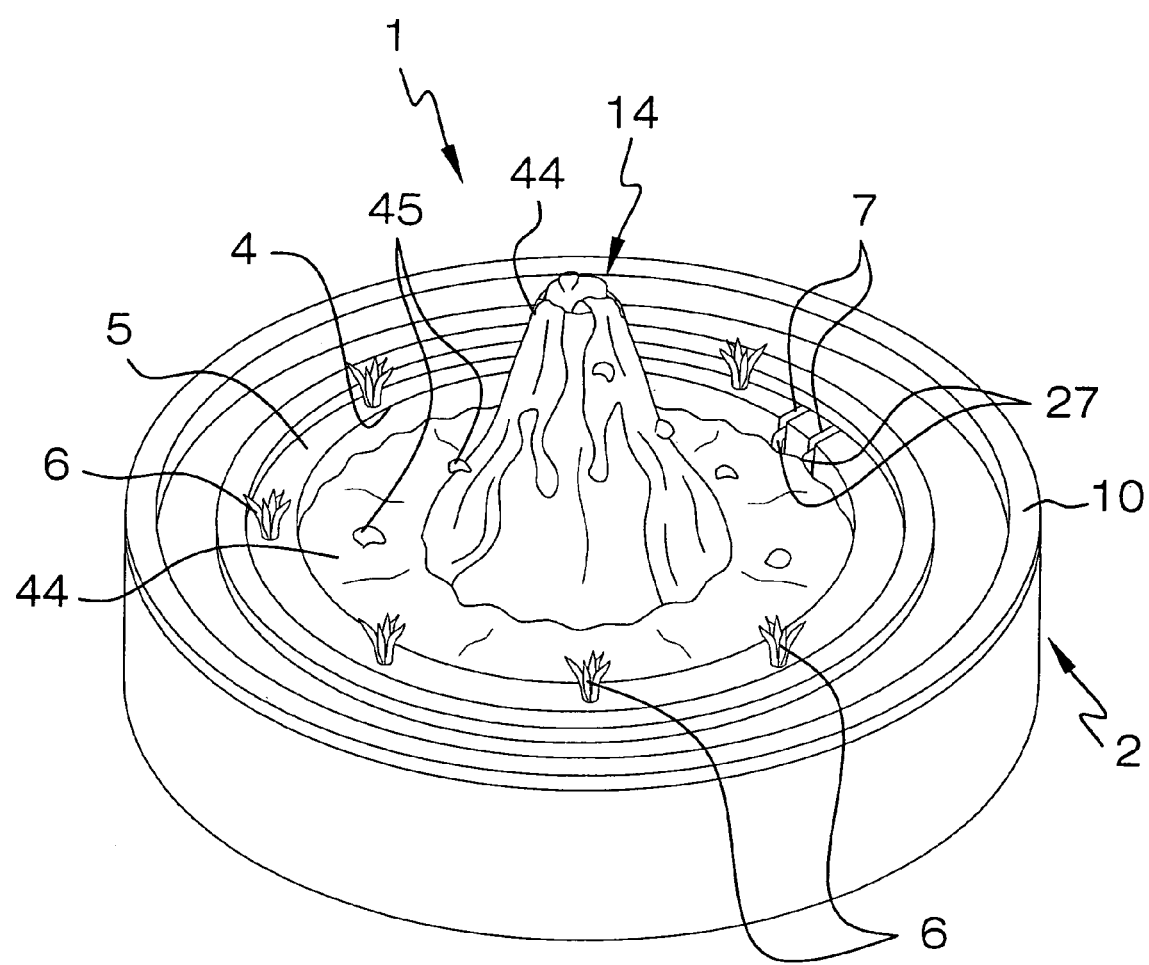
FIG. 1 is a perspective view of an illustrative embodiment of the volcano food fountain, with liquid and solid food being pumped from a simulated volcano of the volcano food fountain.
Figure 8:
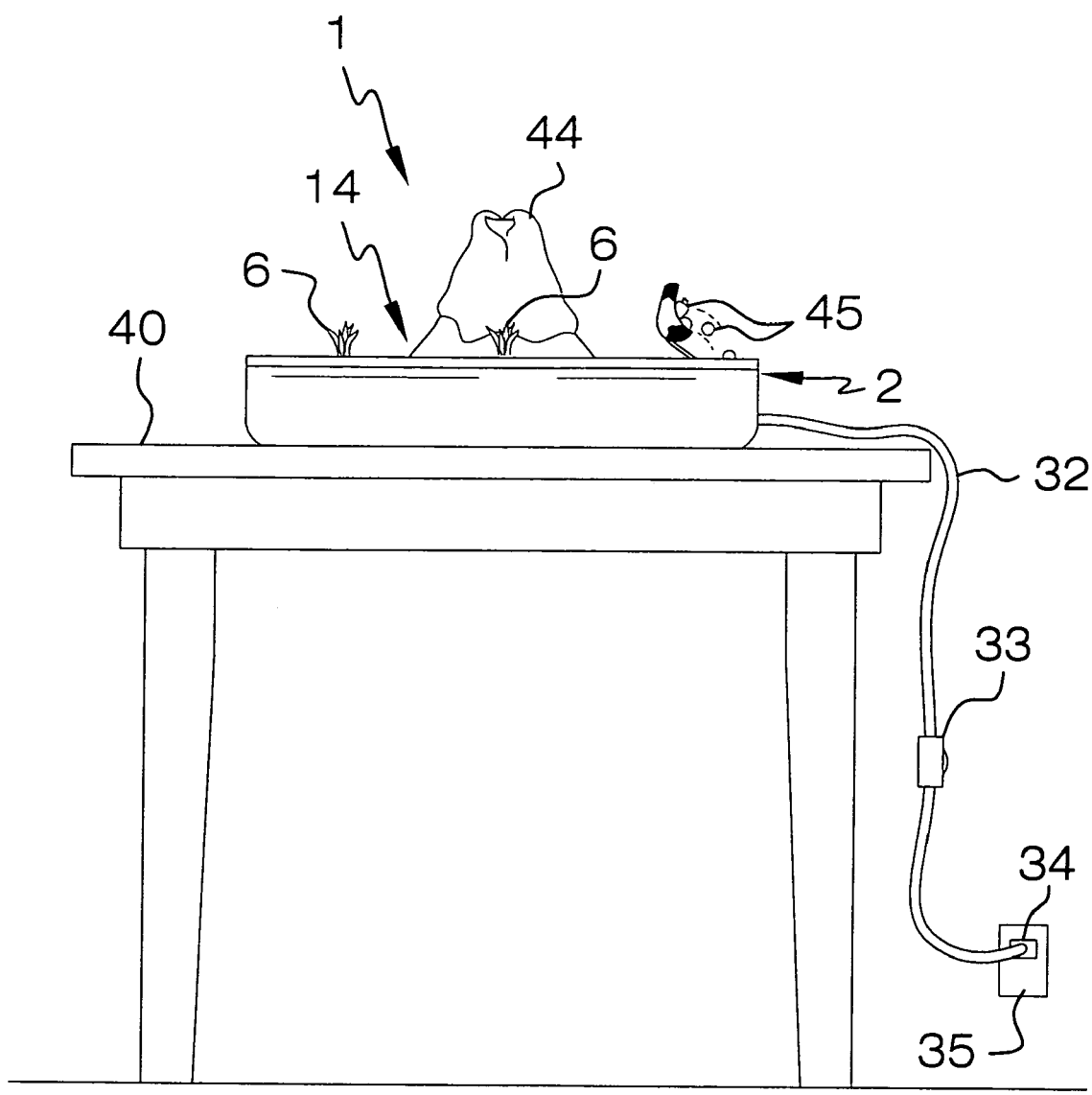
FIG. 8 is a side view of an illustrative embodiment of the volcano food fountain, supported on a table and plugged into an electrical outlet in typical operation of the volcano food fountain.

As shown in FIGS. 1, 4 and 8, in typical use, the plug 34 on the power cord 33 is plugged into the electrical outlet 35. The fountain base 2 is provided on a suitable support such as a table 40, for example. A liquid or liquid and solid food, such as punch or fruit juice 44 and fruit pieces 45, for example, is placed in the bowl 4 of the fountain base 2. Additional food, such as fruit pieces 45, for example, may be placed in the tray 10. The power switch 33 is operated to provide electrical power to the pump 20 (FIG. 3), the servo motor 29 (FIG. 5) and the tray drive motor 11 (FIG. 6). Accordingly, the pump 20 draws the juice 44 and fruit pieces 45 from the bowl 4 through the pump inlet conduit 21 (FIG. 3) and pumps the juice 44 and fruit pieces 45 from the simulated volcano 14 through the pump outlet 22 and volcano opening 17 of the volcano wall 15, respectively. As it exits the volcano opening 17, the juice 44 and fruit pieces 45 flow down the exterior surfaces of the volcano wall 15, as shown in FIGS. 1 and 2, and collect in the bowl 4. Therefore, the flowing juice 44 and fruit pieces 45 resemble lava flowing down the sides of the simulated volcano 14. From the bowl 4, the juice 44 and fruit pieces 45 are again pumped through the pump inlet conduit 21 and pump outlet conduit 22, respectively, and down the exterior surfaces of the simulated volcano 14 in a continuous fashion as long as the pump 20 is operated. Simultaneously, the tray drive motor 11 rotates the tray 10 with respect to the fountain base 2, rendering the fruit 45 in the tray 10 readily accessible to persons (not shown) standing around the table 40. The servo motor 29 (FIG. 5) can be selectively operated to raise and lower the scoop 26 in the bowl 4 in order to retrieve fruit 45 and/or juice 44 from the bowl 4. In some embodiments, the scoop 26 has a screen construction to drain juice 44 through the scoop 26 while retaining the fruit 45 in the scoop 26. The volcano food fountain 1 is selectively turned off using the power switch 33.

While the preferred embodiments of the invention have been described above, it will be recognized and understood that various modifications can be made in the invention and the appended claims are intended to cover all such modifications which may fall within the spirit and scope of the invention.

What is claimed is:

1. A volcano food fountain, comprising:
a fountain base having a bowl;
a scoop carried by said fountain base in said bowl;
a servo motor operably engaging said scoop and adapted to raise and lower said scoop in said bowl;
a simulated volcano carried by said fountain base in said bowl;
a pump provided in said simulated volcano and communicating with said bowl;
a volcano opening provided in said simulated volcano and communicating with said pump; and
a tray carried by said fountain base.

2. The volcano food fountain of claim 1 wherein said tray has a generally annular shape.

3. The volcano food fountain of claim 2 wherein said tray is rotatable with respect to said fountain base.

4. The volcano food fountain of claim 3 further comprising a tray drive motor operably engaging said tray for rotating said tray on said fountain base.

5. The volcano food fountain of claim 1 further comprising a decorative surface carried by said fountain base between said tray and said bowl.

6. The volcano food fountain of claim 5 further comprising simulated vegetation provided on said decorative surface.

7. A volcano food fountain, comprising:
a fountain base having a bowl;
a simulated volcano carried by said fountain base in said bowl;
a pump provided in said simulated volcano and communicating with said bowl;
a volcano opening provided in said simulated volcano and communicating with said pump;
a tray carried by said fountain base;
a ring gear carried by said tray;
a drive gear meshing with said ring gear; and
a tray drive motor carried by said fountain base and drivingly engaging said drive gear.

8. The volcano food fountain of claim 7 wherein said tray has a generally annular shape.

9. The volcano food fountain of claim 8 further comprising a tray slot provided in said fountain base and wherein said tray is provided in said tray slot.

10. The volcano food fountain of claim 7 further comprising a scoop carried by said fountain base in said bowl.

11. The volcano food fountain of claim 10 further comprising a servo motor operably engaging said scoop and adapted to raise and lower said scoop in said bowl.

12. The volcano food fountain of claim 7 further comprising a decorative surface carried by said fountain base between said tray and said bowl.

13. The volcano food fountain of claim 12 further comprising simulated vegetation provided on said decorative surface.

14. A volcano food fountain, comprising:
a fountain base having a bowl;
a simulated volcano carried by said fountain base in said bowl;
a pump provided in said simulated volcano and communicating with said bowl;
a volcano opening provided in said simulated volcano and communicating with said pump;
a tray carried by said fountain base;
a pair of scoop slots provided in said fountain base;
a pair of scoop arms extending through said pair of scoop slots, respectively, and pivotally carried by said fountain base;
a scoop carried by said pair of scoop arms;
a servo motor carried by said base; and
a drive belt coupling said servo motor to said pair of scoop arms.

15. The volcano food fountain of claim 14 wherein said tray has a generally annular shape.

16. The volcano food fountain of claim 15 further comprising a tray drive motor carried by said fountain base and operably engaging said tray for rotating said tray with respect to said fountain base.

17. The volcano food fountain of claim 14 further comprising a decorative surface carried by said fountain base between said tray and said bowl.

18. The volcano food fountain of claim 17 further comprising simulated vegetation provided on said decorative surface.

* * * * *